(No Model.)
L. SCHUTTE.
Liquid Elevator.
No. 240,276.  Patented April 19, 1881.
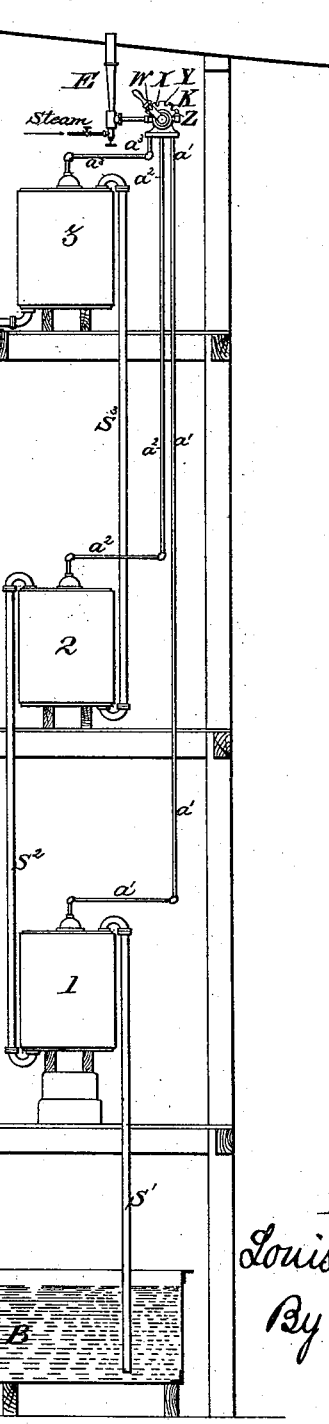
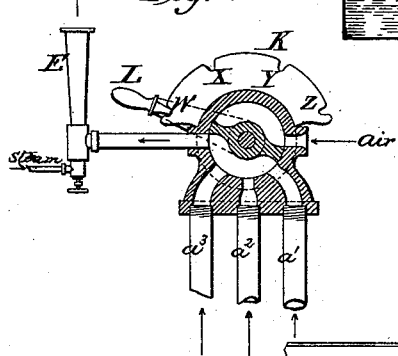
Witnesses.
Sidney P. Hollingsworth
Walter S. Dodge
Inventor.
Louis Schutte
By Dodge & Son
Attys

UNITED STATES PATENT OFFICE.

LOUIS SCHUTTE, OF PHILADELPHIA, PENNSYLVANIA.

LIQUID-ELEVATOR.

SPECIFICATION forming part of Letters Patent No. 240,276, dated April 19, 1881.

Application filed February 17, 1881. (No model.)

*To all whom it may concern:*

Be it known that I, LOUIS SCHUTTE, of Philadelphia, in the county of Philadelphia and State of Pennsylvania, have invented certain Improvements in Apparatus for Elevating Liquids, of which the following is a specification.

My invention consists in a combination and arrangement of parts and apparatus by means of which liquids may be raised to any height by suction only. This I accomplish by placing a number of tanks or receptacles at different elevations at such distances from each other that no distance is greater than would correspond to the vacuum which can be obtained.

The accompanying drawings show an arrangement of this kind, Figure 1 being a side elevation of the apparatus; Fig. 2, a vertical section of the valve.

By creating a vacuum in tank 1 the liquid is raised into it from the tank B by creating a vacuum in tank 2, and admitting air on top of liquid in tank 1, the liquid is raised into tank 2, and by creating a vacuum in tank 3 and admitting air on top of liquid in tank 2, the liquid is raised into tank 3, from which it discharges into the storage-tank T. Thus it will be seen that any desired height of elevation may be obtained by adding to the number of tanks, leaving the distance between the successive tanks within the limits attainable by a vacuum. Such an arrangement may properly be called a "suction-ladder."

My invention consists in the arrangement and means employed to properly control the admission of the air and confining the vacuum to the respective tanks during the operation of elevating.

In Fig. 1, B is the lower storage-tank. 1, 2, and 3 are intermediate tanks or receptacles. T is the upper storage-tank. S', S², and S³ are suction-pipes for the liquid. V is a discharge-valve opening outward from tank 3. A', A², and A³ are air-pipes communicating with the vacuum apparatus or the atmosphere. E is a steam-jet exhauster, and K is the distributing valve or cock which governs the communication of the different tanks with either the vacuum apparatus or the atmosphere.

Fig. 2 is an enlarged section of the valve K. The mode of operation is as follows: The valve K, being in the position shown, forms a communication between the exhauster and pipes A', A², and A³, extending to tanks 1, 2, and 3, and an equal vacuum or partial vacuum corresponding to the power of the exhauster will be found in all three tanks, the discharge-valve V being closed by the pressure of the atmosphere from the outside. As soon as the vacuum corresponds to the height of suction-pipe S', tank 1 will fill and the liquid will rise up in S² and A', up to the limit of suction. When this is reached the lever L is turned into the notch X, by which the vacuum is still retained in tanks 2 and 3, but air admitted into tank 1 through the pipe A'. This will occasion a flow of the liquid from tank 1 into tank 2 through suction-pipe S², and also up suction-pipes S³ and A² to the limit of suction. When this is reached the lever L is turned into the notch Y, by which the vacuum is still retained in the tank 3, but air is admitted into tank 2 through the pipe A². This will occasion a flow of the liquid from tank 2 into tank 3 through the suction-pipe S³. When tank 3 is full the lever L is turned into notch Z, by which the exhauster is isolated and air admitted into tank 3, which will cause the liquid to discharge itself through valve V into the upper storage-tank T.

It will readily be seen that in such an arrangement the height to which a liquid may be elevated is unlimited, as the operation, as described, may be carried on *ad infinitum*. When a charge is delivered in the upper storage-tank, T, the lever L is brought back to the notch W, and the next charge taken up in the same manner.

By creating a vacuum in all tanks simultaneously the liquid forms a seal against the admission of the air from the bottom upward, and no cocks or valves are required in any of the suction-pipes to exclude the air from the top downward, thus doing away with the large valves or other contrivances which would otherwise be necessary. The means of creating a vacuum does not effect the operation, and may be a pump, a steam-jet exhauster, as shown here, or any other of the known methods of creating a vacuum.

To prevent a waste of power by a continuous working of the exhauster E during the rising and discharging of the liquid, or to obviate the necessity of stopping the exhauster after a sufficiently high vacuum is obtained for a lift, also for reasons of economy in power, I arrange the tanks at varying distances from each other. For example, in this case S' is shorter than S², S² is shorter than S³, and so on, making the distance between the two uppermost tanks to correspond with the limit of suction. The object which I gain by this arrangement is, that the lower tank is filled before the maximum vacuum is reached, and that during the time of filling the vacuum in the next tank will have become sufficiently high to correspond with its height of suction, and so on utilizing the continuous working of the exhauster.

The operation of the valve K may be effected by hand, or may be made automatic by any of the known devices of clock-work timing the shifting of the lever, a direct-acting steam-slide timed by the variable discharge of a dash-pot, or other methods.

What I claim as my invention, and desire to secure by Letters Patent, is—

1. The combination, in a liquid-elevating apparatus operated by vacuum, of two or more closed receivers or tanks at different levels, and valveless or open suction-pipes connecting said tanks, substantially as described and shown.

2. The combination of two or more closed receivers or tanks at different levels, open or valveless suction-pipes connecting the receivers, an exhauster or vacuum apparatus, pipes extending from the latter to the respective tanks, and a valve or valves, whereby one or more of the tanks may be shut off from communication with the exhauster.

3. In combination with two or more closed receivers or tanks at different levels, and open suction-pipes connecting said receivers, an air-exhauster communicating with each tank, whereby a vacuum or partial vacuum may be created in all of the receivers simultaneously, or in any number of them, while the others are in communication with the atmosphere.

4. In combination with the closed tanks, suction-pipes, air-pipes, and exhauster, a multiple valve, substantially as shown, connecting with the exhauster, the air, and the air-pipes, substantially as shown and described.

5. In a vacuum fluid-elevator, substantially as described, a series of closed connected tanks or receivers arranged at different levels and at varying distances apart, substantially as and for the purpose described.

6. The improved valve for vacuum fluid-elevators, consisting of the case provided with an opening to the atmosphere and adapted to receive an exhauster-connection, and two or more air-pipes, and the internal rotary diaphragm.

7. The combination of the closed tanks, the connecting-pipes between them, the exhauster, the air-pipes forming a communication between the exhauster and the individual tanks, and a valve or valves, whereby one or more of the tanks may be shut off from the exhauster and opened to the atmospheric pressure.

LOUIS SCHUTTE.

Witnesses:
  W. R. SCOTT,
  BENTON O. SEVERN.